(12) United States Patent
Peterson et al.

(10) Patent No.: US 9,332,525 B2
(45) Date of Patent: May 3, 2016

(54) INTELLIGENT REPEAT OF NOTIFICATIONS

(71) Applicant: Lenovo (Singapore) Pte. Ltd., Singapore (SG)

(72) Inventors: Nathan J. Peterson, Durham, NC (US); Russell Speight VanBlon, Raleigh, NC (US); John Carl Mese, Cary, NC (US); Rod D. Waltermann, Rougemont, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 34 days.

(21) Appl. No.: 14/164,720

(22) Filed: Jan. 27, 2014

(65) Prior Publication Data
US 2015/0215896 A1    Jul. 30, 2015

(51) Int. Cl.
*H04W 68/04* (2009.01)
*H04L 12/58* (2006.01)

(52) U.S. Cl.
CPC .............. *H04W 68/04* (2013.01); *H04L 51/24* (2013.01)

(58) Field of Classification Search
CPC ..... H04W 68/00; H04W 68/02; H04W 68/04; H04W 68/06; H04L 51/24
USPC ........ 455/41.1, 41.2, 41.3, 421, 422.1, 456.1, 455/67.11, 550.1, 575.1, 226.1, 229
See application file for complete search history.

(56) References Cited

U.S. PATENT DOCUMENTS

| 6,219,540 | B1 * | 4/2001 | Besharat et al. | 455/421 |
| 2007/0054640 | A1 * | 3/2007 | Wada et al. | 455/226.1 |
| 2008/0039040 | A1 * | 2/2008 | Patel et al. | 455/226.2 |
| 2015/0065055 | A1 * | 3/2015 | Newham et al. | 455/41.3 |

* cited by examiner

*Primary Examiner* — Thanh Le
(74) *Attorney, Agent, or Firm* — Ference & Associates LLC

(57) ABSTRACT

An aspect provides a method, including: detecting, at an information handling device, an event that causes a notification to occur; providing, using a notification modality of the information handling device, the notification of the event; sensing, using at least one sensor of the information handling device, a condition existing while the notification is provided; determining, using a processor, that the condition conflicts with the notification modality used to provide the notification; and thereafter providing an additional notification of the event. Other aspects are described and claimed.

20 Claims, 3 Drawing Sheets

INTELLIGENT REPEAT OF NOTIFICATIONS

BACKGROUND

Information handling devices ("devices") come in a variety of forms, for example laptop computing devices, tablet computing devices, smart phones, and the like. Users communicate with one another using a variety of communication modalities offered by the devices, e.g., telephone calls, text messages, instant messages, social media interactions, emails, etc.

User devices strive to notify the device users, e.g., of incoming telephone calls, received emails and texts, social media events, etc. The notifications may use a variety of notification components, e.g., speakers or other audible components, haptic actuators, flashing lights, etc., to notify the user of the event, e.g., received email, text or the like. While a great many notification techniques utilizing a variety of notification modalities are available, users often have difficulty staying appropriately apprised of various events.

BRIEF SUMMARY

In summary, one aspect provides a method, comprising: detecting, at an information handling device, an event that causes a notification to occur; providing, using a notification modality of the information handling device, the notification of the event; sensing, using at least one sensor of the information handling device, a condition existing while the notification is provided; determining, using a processor, that the condition conflicts with the notification modality used to provide the notification; and thereafter providing an additional notification of the event.

Another aspect provides an information handling device, comprising: a sensor; a notification component; a processor operatively coupled to the sensor and the notification component; a memory device that stores instructions accessible to the processor, the instructions being executable by the processor to: detect, at the information handling device, an event that causes a notification to occur; provide, using a notification modality of the information handling device, the notification of the event; sense, using the sensor, a condition existing while the notification is provided; determine that the condition conflicts with the notification modality used to provide the notification; and thereafter provide an additional notification of the event.

A further aspect provides a product, comprising: a storage device having code stored therewith, the code being executable by a processor and comprising: code that detects, at an information handling device, an event that causes a notification to occur; code that provides, using a notification modality of the information handling device, the notification of the event; code that senses, using at least one sensor of the information handling device, a condition existing while the notification is provided; code that determines, using a processor, that the condition conflicts with the notification modality used to provide the notification; and code that thereafter provides an additional notification of the event.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
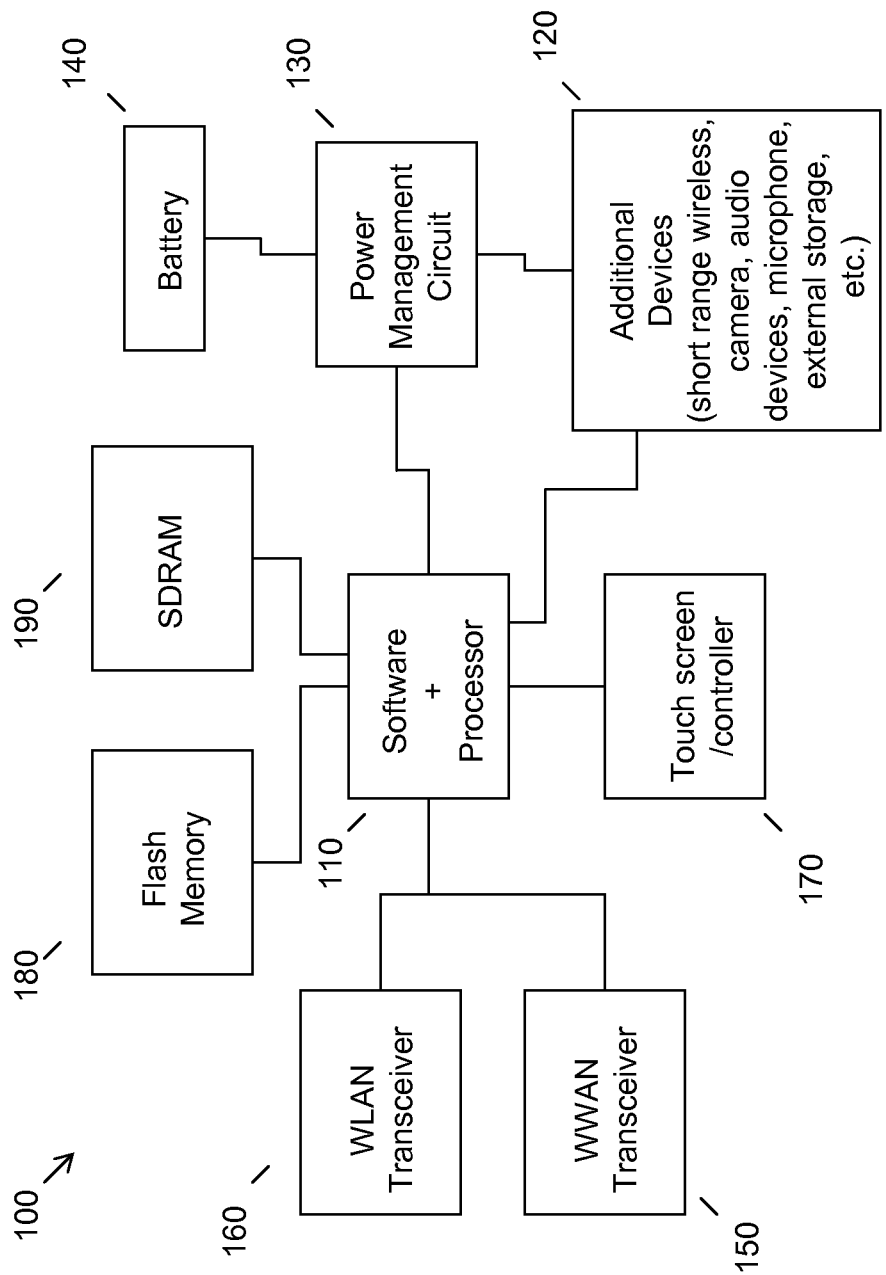
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, while many different techniques are available for providing event notifications, device users are often frustrated in that they miss an important message or are repeatedly notified of an unimportant message, e.g., until they manually clear the notification. For example, a common problem with mobile devices or cell phones is that if a user is moving a lot, driving with the window down, biking, walking, etc, and if a device notification comes in during this high movement and/or high noise environment, the user most likely will not hear the notification or feel the vibration notification, depending on how the user has set the device notification settings.

Current solutions include constant and repeated notifications to the user until they dismiss or accept the notification. An issue with this approach is that if the user left their phone somewhere or left it sitting on their desk while they are away, this method of repeated notifications is not generally desirable and may add to battery drain. Moreover, the user is left to manually clear the notification.

Accordingly, an embodiment provides a method for intelligently determining when to re-notify the user of a notification that occurred on a mobile device. An embodiment may take into account a device condition (e.g., high noise environment) as well as a notification modality (e.g., audible notification setting) in determining if a device notification should be repeated. For example, when a user is in a high motion or high noise environment and they miss a notification that came in during this time, according to an embodiment, the mobile device will at this point continue to detect the high motion/sound environment and wait until a preset level of sound or motion is obtained. An embodiment may thereafter re-notify the user of the missed event. The user's device may additionally send a response back to the person initiating the notification, e.g., a communication informing the message sending user that the receiving user is in an environment where he or she can't be appropriately notified of the received message. In an embodiment, a variety of factors may be used to determine the appropriate handling (e.g., modality, timing, repetitiveness, etc.) of repeated/additional notifications. For example, the additional or repeated notification response may be influenced based on learned user activity, e.g., a user does not typically respond to notifications in a particular environment. Additionally or in the alternative, a user may pre-set notification (including repeated/additional notification) configurations.

An embodiment may utilize a variety of ways of determining what to do or how to decide when to re-notify the user. For example, if the mobile device is in a high sound and low motion environment, but the mobile device is set to vibrate mode, then an embodiment may determine that a re-notification is not necessary given that the environment should not be interfering with the type of notification modality the device is set to. Similarly, if the device is in a high motion/low sound environment and the device is set to utilize audible notifications, then again an embodiment may determine that no re-notification is necessary. The mobile device also may have threshold(s), which may be user configurable, on the noise or motion levels necessary to trigger a re-notification process.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included. System 100 often includes a touch screen 170 for data input and display/rendering. System 100 also typically includes various memory devices, for example flash memory 180 and SDRAM 190.

Figure 2:
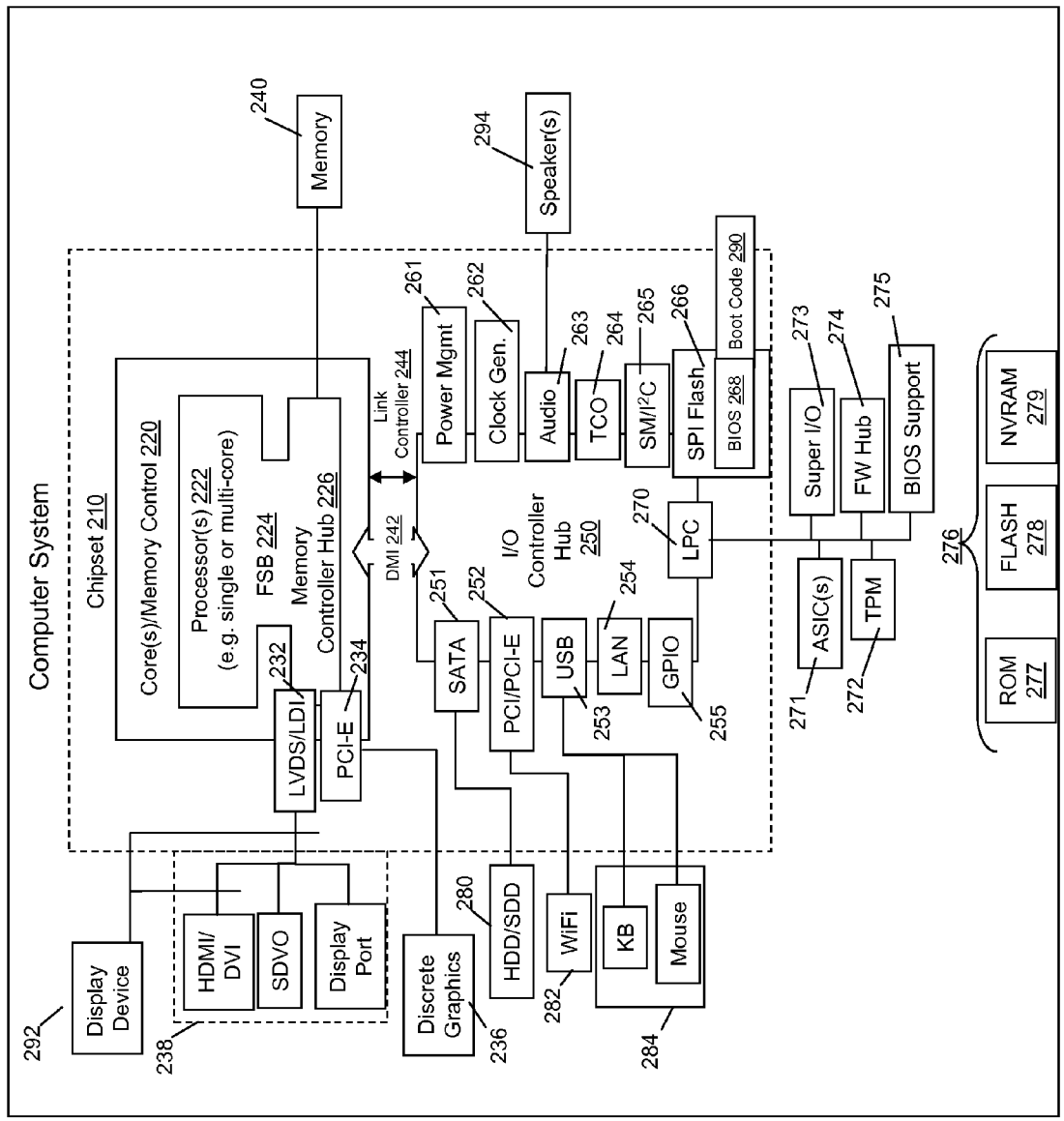
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Figure 3:
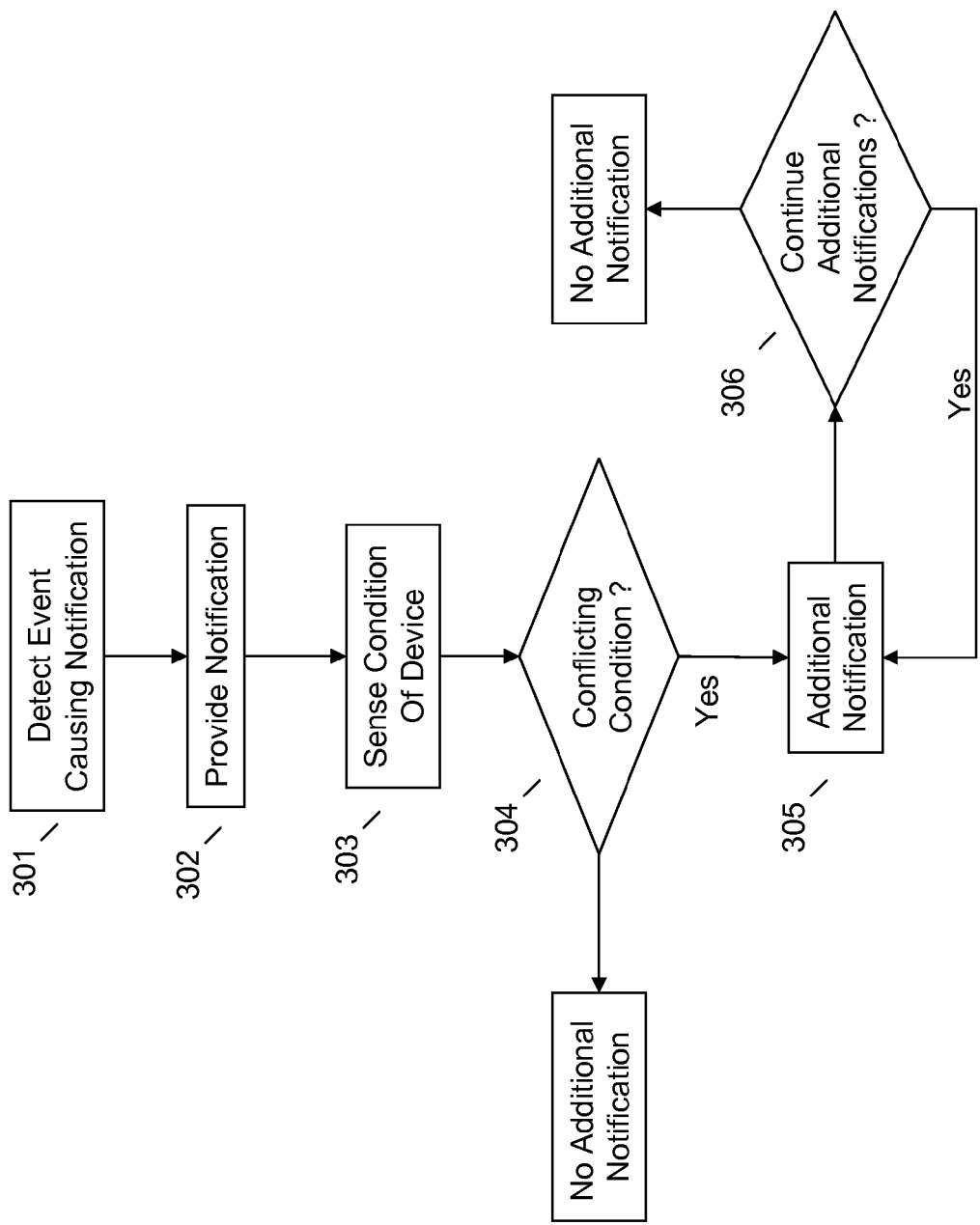
FIG. 3 illustrates an example method of intelligently repeating notifications.

Information handling device circuitry, as for example outlined in FIG. 1 or FIG. 2, may be utilized in user devices that provide notifications in response to events such as receipt of text messages, emails, telephone calls, etc. Referring to FIG. 3, an embodiment assists in intelligently notifying a user under certain conditions.

An embodiment may detect an event that causes a notification to occur at 301, e.g., the user device receives a text message. An embodiment may, e.g., according to current text message notifications settings, provide a notification thereof at 302, e.g., using the default notification modality of provided in the settings. An embodiment may also sense a condition of the device associated with the notification, e.g., in time, at 303. For example, when the text message is received and a notification, e.g., an audible notification, an embodiment may sense at 303 the noise level of the device environment, e.g., utilizing a microphone of the device.

An embodiment may utilize the sensed information, e.g., an environmental noise level exceeding a predetermined noise level, and therefore determine at 304 that the condition conflicts with the notification modality. By way of example, an embodiment may determine at 304 that, given that an audible notification modality is being used and given that the environmental noise sensed by the device is high (i.e., exceeds a predetermined threshold), there is a conflict between the condition and the modality such that the notification may go unnoticed by the user.

If no conflict exists, an embodiment may provide no additional notification. However, if a conflicting condition is determined at 304, an embodiment may thereafter provide an additional notification of the event at 305. The additional notification of the event may include a repeated notification utilizing the same modality and/or an additional notification using a different notification modality, e.g., haptic or vibrating notification modality, visual notification modality such as a flashing light, etc.

If an embodiment determines that there is a conflicting condition such that an additional notification should be provided at 305, an embodiment may take other actions. For example, an embodiment may send a communication, e.g., automated text message response, to the user sending the original text message, e.g., indicating that there may be a lack of notification for the receiving user.

Moreover, an embodiment may tailor the timing, nature and duration of the additional or repeated notification(s). For example, an embodiment may determine that an additional notification provided at 305 should not be provided unless or until the conflicting condition has been cleared, e.g., noise level drops below a predetermined threshold. Additionally or in the alternative, an embodiment may choose to modify the modality of the notification. For example, an embodiment may switch the notification modality to another modality given the information regarding the conflicting condition determined at 304. Thus, an embodiment may provide an additional notification using a haptic modality in a condition where the ambient noise level is high.

Moreover, an embodiment may provide a series or repeat the additional notification, e.g., according to a policy at 306. For example, an embodiment may determine at 306 is one or more continuation conditions exist for repeating the notification. These may be selected (and user adjustable) such that, while additional or repeated notifications are provided, these notifications are not burdensome for the user. For example, an embodiment may implement repeated or additional notifications according to a policy that factors in user history, a current or ongoing sensed condition of the information handling device, the available notification modalities, etc. Therefore, an embodiment may determine that, given a different notification modality is available, one repeated notification may suffice to adequately notify the user with a non-conflicting modality. This may save device resources, e.g., device battery. As another example, an embodiment may determine that more than one notification is necessary given an ongoing or persistent conflicting condition and/or a user's history of device interaction in certain conflicting conditions, use of certain notification modalities, etc.

An embodiment thus provides for intelligent management of repeated or additional notifications such that a user may be more appropriately apprised of events giving rise to a default notification. The permits a device user to be notified of an event when, e.g., the default modality is likely ineffective but avoids situations where notifications are unnecessarily repetitive.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system."Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at an information handling device, an event that causes a notification to occur;
   providing, using a notification modality of the information handling device, the notification of the event;
   sensing, using at least one sensor of the information handling device, a condition existing while the notification is provided;
   determining, using a processor, that the condition conflicts with the notification modality used to provide the notification; and
   thereafter providing an additional notification of the event.

2. The method of claim 1, wherein the condition is selected from the group consisting of a noisy environment and a motion environment.

3. The method of claim 2, wherein the notification modality comprises an audible notification; and
   said detecting comprises detecting a noisy environment.

4. The method of claim 2, wherein the notification modality comprises a vibration notification; and
   said detecting comprises detecting a motion environment.

5. The method of claim 1, further comprising:
   sensing, using at least one sensor, a condition after the notification has been provided; and
   determining, using a processor, that the condition does not conflict with the notification modality;
   wherein said additional notification comprises a repeated notification.

6. The method of claim 1, further comprising:
   sensing, using at least one sensor, a condition after the notification has been provided; and
   determining, using a processor, that the condition conflicts with the notification modality;
   wherein said additional notification is provided using a different notification modality.

7. The method of claim 1, wherein said additional notification comprises a single, additional notification.

8. The method of claim 1, wherein said additional notification comprises repeated additional notifications provided according to a policy.

9. The method of claim 8, wherein said policy is determined via a factor selected from the group consisting of user history, current sensed condition of the information handling device, and available notification modalities.

10. The method of claim 1, further comprising after determining that the condition conflicts with the notification modality, sending a communication to another user device regarding a lack of notification.

11. An information handling device, comprising:
    a sensor;
    a notification component;
    a processor operatively coupled to the sensor and the notification component;
    a memory device that stores instructions accessible to the processor, the instructions being executable by the processor to:
    detect, at the information handling device, an event that causes a notification to occur;
    provide, using a notification modality of the information handling device, the notification of the event;
    sense, using the sensor, a condition existing while the notification is provided;
    determine that the condition conflicts with the notification modality used to provide the notification; and
    thereafter provide an additional notification of the event.

12. The information handling device of claim 11, wherein the condition is selected from the group consisting of a noisy environment and a motion environment.

13. The information handling device of claim 12, wherein the notification modality comprises an audible notification; and
    to detect comprises detecting a noisy environment.

14. The information handling device of claim 12, wherein the notification modality comprises a vibration notification; and
    to detect comprises detecting a motion environment.

15. The information handling device of claim 11, wherein the instructions are further executable by the processor to:
    sense, using the sensor, a condition after the notification has been provided; and
    determine that the condition does not conflict with the notification modality;
    wherein said additional notification comprises a repeated notification.

16. The information handling device of claim 11, wherein the instructions are further executable by the processor to:
    sense, using the sensor, a condition after the notification has been provided; and
    determine that the condition conflicts with the notification modality;
    wherein said additional notification is provided using a different notification modality.

17. The information handling device of claim 11, wherein said additional notification comprises a single, additional notification.

18. The information handling device of claim 11, wherein said additional notification comprises repeated additional notifications provided according to a policy.

19. The information handling device of claim 18, wherein said policy is determined via a factor selected from the group consisting of user history, current sensed condition of the information handling device, and available notification modalities.

20. A product, comprising:
   a non-signal storage device having code stored therewith, the code being executable by a processor and comprising:
   code that detects, at an information handling device, an event that causes a notification to occur;
   code that provides, using a notification modality of the information handling device, the notification of the event;
   code that senses, using at least one sensor of the information handling device, a condition existing while the notification is provided;
   code that determines, using a processor, that the condition conflicts with the notification modality used to provide the notification; and
   code that thereafter provides an additional notification of the event.

* * * * *